J. CHAPPEL.
Horse Rake.
No. 30,666.
Patented Nov. 20, 1860.
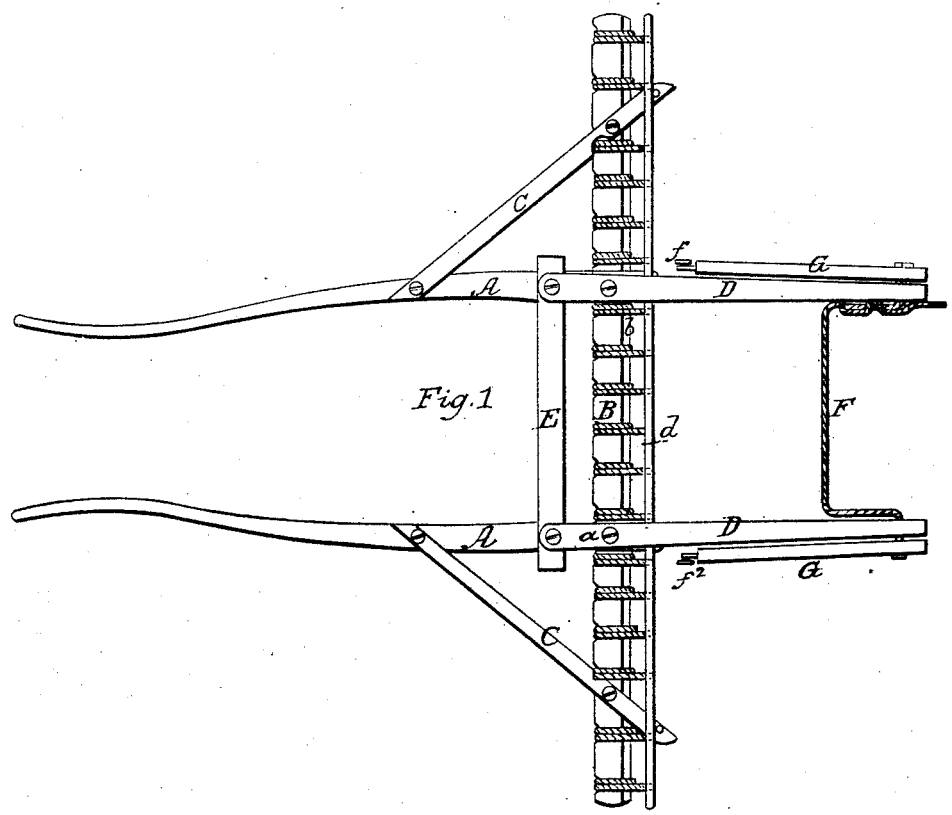
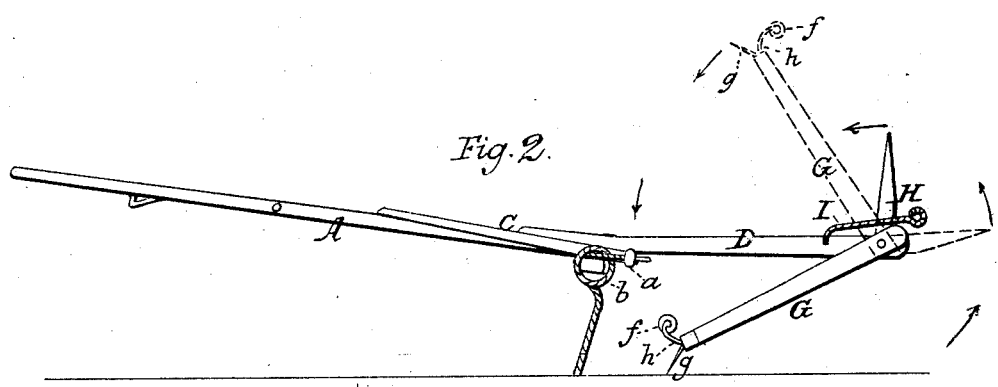
Witnesses:
Edw. F. Brown
J. B. Woodruff
John Chappel

UNITED STATES PATENT OFFICE.

JOHN CHAPPEL, OF GREENE, NEW YORK.

IMPROVEMENT IN HORSE-RAKES.

Specification forming part of Letters Patent No. 30,666, dated November 20, 1860.

*To all whom it may concern:*

Be it known that I, JOHN CHAPPEL, of the town of Greene, in the county of Chenango, State of New York, have invented new and useful Improvements in the Construction of Horse-Rakes; and I do hereby declare that the following is a clear and exact description of the same, reference being had to the accompanying drawings, making a part of this specification, in which—

Figure 1 represents a plan or top view of the machine with the mode of fastening the teeth. Fig. 2 shows a side elevation with the mechanism for lifting it up and discharging in windrows.

My invention consists in the construction and arrangement of the crank-handle, levers, and spring-catch operating together to elevate the rake, as hereinafter described.

To enable others skilled in the art to make and use my invention, I will describe it more fully, referring to the drawings and the letters marked thereon.

The thills or shafts A A are bolted to the piece of timber B, which forms the rake-head, of any desired length. The two ends that extend out are braced to the thills by the pieces c c, bolted to them. The two pieces D D, extending back, are secured by the same bolts or screws, a a, which hold the rake-head to the shafts A A, across which is the whiffletree-bar E, secured by screws in the same manner. There is a separate bar, b, of the same length and thickness of the rake-head, which slips in at the back and fills the curve edgewise in the rake-teeth, bringing them into the notches so as to bear firmly. The bent ends of the teeth, being flattened, are fitted into mortises through another bar, d, which is framed on and keyed to the shafts and braces. To the rear ends of the pieces D D is attached a crank-handle, F, made of an iron rod, with bearings at each end, on which are levers G G, placed in a line with the crank, which are of sufficient length to raise the rake-teeth over the gavel or windrow, when they are allowed to drop on or come in contact with the ground. This is effected by having an iron spike or prong, $g$, inclined so as to catch at once and bring the levers G G on end, at which time they will strike on the rollers $ff$ in bearings $h \ h$, inclined in the opposite direction to the prongs $g \ g$, and will produce a jar on the rake so as to liberate the hay or grain, at the same time throw back so as to bring the long spike H in contact with the ground as soon as the rake resumes its position, and sets the levers G G over and out of the way, as seen in red lines in Fig. 2, where it is held by the spring-catch I until it is liberated by the driver, when it falls by its own weight and liberates the substance, as before described. The crank-handle and levers may be made adjustable on the pieces extending back, and secured at any desired distance from the rake.

The great advantages of my horse-rake are its lightness of structure, the simple and efficient mode of securing the teeth, and the easy manner in which they can be liberated and taken off should any of them be broken; also, the easy manner in which it is operated to discharge the contents collected, there being no labor required by the driver in lifting the machine or any part of it, there being no levers to be operated by hand, the machine performing all its functions automatically by simply moving the spring-catch and letting the crank-handle and levers down by their own gravity. As soon as the prongs catch hold of the ground the motion forward instantly raises it with such force as to do what is required in the most efficient manner.

Having thus fully described my invention and its operation, what I claim as new, and desire to secure by Letters Patent, is—

The arrangement and combination of the prongs $g \ g$, the rollers $f \ f$, levers G G, crank-handle F, and spring-catch I, in the manner as herein described, for the purposes set forth.

JOHN CHAPPEL.

Witnesses:
 EDM. F. BROWN,
 J. B. WOODRUFF.